United States Patent [19]

Capelle

[11] Patent Number: 4,735,565
[45] Date of Patent: Apr. 5, 1988

[54] PIN-BARREL EXTRUSION DEVICE HAVING A BARREL TEMPERATURE CONTROL MEANS

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 933,205

[22] Filed: Nov. 21, 1986

[30] Foreign Application Priority Data

Nov. 23, 1985 [DE] Fed. Rep. of Germany ....... 3541499

[51] Int. Cl.$^4$ ............................................. B29C 47/38
[52] U.S. Cl. ....................................... 425/208; 366/80
[58] Field of Search ............... 425/208, 207, 185, 190, 425/550, 376 R, 376 B; 366/80, 90; 100/117, 150, 145; 241/260.1

[56] References Cited

U.S. PATENT DOCUMENTS

| 3,672,641 | 6/1972 | Slaby | 366/90 X |
|---|---|---|---|
| 3,814,563 | 6/1974 | Slaby et al. | 100/150 X |
| 4,178,104 | 12/1979 | Menges et al. | 366/80 |
| 4,581,992 | 4/1986 | Koch | 366/90 X |
| 4,629,326 | 12/1986 | Huls | 366/80 |
| 4,629,327 | 12/1986 | Capelle | 366/80 |
| 4,696,575 | 9/1987 | Upmeier | 425/208 X |

FOREIGN PATENT DOCUMENTS 2931387  2/1981  Fed. Rep. of Germany .

Primary Examiner—Richard L. Chiesa
Attorney, Agent, or Firm—Schwartz, Jeffery, Schwaab, Mack, Blumenthal & Evans

[57] ABSTRACT

A pin-barrel extrusion device having a barrel temperature control means between the outer and inner hollow cylinders of the barrel and an apparatus for adjusting the radial depth of penetration of the pins into the inner hollow cylinder is disclosed in which problems due to different rates of thermal expansion of the cylinders in the axial direction are obviated or at least minimized. This is achieved by locating the pins in guide sleeves, which sleeves are detachably mounted in a bore formed in the inner cylinder and pass through aligned bores in the outer cylinder. The outer cylinder bores have a diameter larger than that of the sleeves so that an annular gap is defined between the bores and the cylinder. This provides room for movement of the sleeve if the inner cylinder on which it is mounted expands at a different rate to that of the outer cylinder.

6 Claims, 4 Drawing Sheets

PIN-BARREL EXTRUSION DEVICE HAVING A BARREL TEMPERATURE CONTROL MEANS

FIELD OF THE INVENTION

The present invention relates to a pin-barrel extrusion device having a barrel temperature control means. More particularly, the present invention relates to a pin-barrel extrusion device comprising concentric, hollow, inner and outer cylinders spaced apart from one another and an extruder screw which rotates within the inner cylinder.

BACKGROUND OF THE INVENTION AND PRIOR ART DISCUSSION

A pin-barrel extrusion device generally of the above type is disclosed in German Offenlegungsschrift No. 2,931,387. In the arrangement shown in FIG. 1 of such prior document, there is shown an inner hollow cylinder having an outer hollow cylinder coaxially disposed therearound. The rate of wear of the inner cylinder depends upon the material being processed and hence such cylinder must be made interchangeable.

Helically encircling temperature control passages are disposed in the annular gap between the inner and outer hollow cylinders. Moreover, pins protrude radially inwardly thrugh the cylinders to lie adjacent the core of the extrusion screw which rotates in the inner cylinder or barrel.

Frictional heat is produced during the operation of such a pin-barrel extrusion device, which heat causes thermal expansion of the inner cylinder. Such expansion may be of the order of 1 mm if the operating temperature is 100° C. and the length of the barrel portion is approximately 100 cm.

The thermal expansion of the outer hollow cylinder is less than that of the inner cylinder because it can dissipate heat radially outwardly to ambient atmosphere. Accordingly, relative movement occurs between the inner hollow cylinder and the outer hollow cylinder in the longitudinal direction of the barrel portions. This relative movement produces large stresses on the pin bodies protruding through the cylinders, which stresses may result in the pin bodies becoming deformed or even breaking.

OBJECTS OF THE INVENTION

The present invention seeks to provide a pin-barrel extrusion device having an interchangeable inner hollow cylinder generally of the type described hereinbefore but in which stresss on the pin bodies which project radially inwardly into the interior of the barrel portion are at least minimized and, in consequence, to ensure that the depth of penetration of the pin bodies into the barrel portion may be easily adjusted.

SUMMARY OF THE INVENTION

According to the present invention, there is provided a pin-barrel extrusion device for processing thermoplastics, the barrel comprising a hollow inner cylinder and an outer hollow cylinder coaxial with the inner cylinder, the outer cylinder being disposed radially outwardly of the inner cylinder but spaced apart therefrom, an extrusion screw being mounted for rotation within the inner cylinder, adjustable pin bodies which are each disposed in a guide sleeve and project radially inwardly into the hollow interior of the inner cylinder such that the radially inner ends thereof lie adjacent the core of the extrusion screw and bore means utilised for controlling the temperature of the barrel wherein the guide sleeve for each radially adjustable pin body is detachably mounted in a radial bore formed in the inner hollow cylinder and extends through a radial bore formed in the outer hollow cylinder whereby an annular gap is defined between the guide sleeve and the radial bore in the outer cylinder.

Due to the detachable mounting of the guide sleeve for the pin bodies in a radially-extending bore formed in the inner cylinder, the guide sleeves, and hence the pin bodies, can move as thermal expansion of the inner hollow cylinder occurs. At the same time, by providing a bore in the hollow outer cylinder having a diameter larger than that of the guide sleeve, an annular gap is defined between the guide sleeve and the bore in the outer cylinder. Consequently, any difference in thermal expansion between the hollow outer cylinder and the hollow inner cylinder does not cause the guide sleeves, and hence the pin bodies, to become stressed or deformed.

Advantageously, the guide sleeve is screw-threadedly retained in position in the radial bore in the inner hollow cylinder.

Alternatively, the detachable mounting of the guide sleeve in the hollow inner cylinder comprises a bayonet-type locking member.

Preferably, an annular flange is provided at the end of the guide sleeve remote from the extrusion screw, the flange having a slot formed therein for receiving a rotation-preventing locking pin, the locking pin being screw-threadedly retained in position in the hollow outer cylinder.

This measure precludes the possibility of the guide sleeve, which is screw-threadedly retained in the hollow inner cylinder, rotating or working loose.

In a preferred embodiment, the guide sleeve forms part of the cylinder of a hydraulic piston and cylinder arrangement, the hydraulic cylinder extending through a radially extending bore formed in the hollow outer cylinder such that an annular gap is defined between the hydraulic cylinder and the bore in the hollow outer cylinder.

Relative movement of the inner and outer cylinders due to differing thermal expansion phenomena are thus absorbed by the free annular gap between the guide sleeve and the bore in the hollow outer cylinder and cannot therefore cause adverse effects.

In addition, by forming the pin body as the piston rod of the hydraulic cylinder, a particularly favourable economical and technically advantageous arrangement is achieved because the pin bodies are provided with an extremely simple form of radial adjustability. At the same time, all stresses due to differential thermal expansion between the hollow inner cylinder and the hollow outer cylinder are still precluded.

Desirably, in such an arrangement, the piston rods of the hydraulic cylinders forming the pin bodies are disposed in a wearing bush which terminates substantially flush with the inner surface of the hollow inner cylinder. By doing so, it becomes unnecessary to interchange or replace an entire hydraulic cylinder when wear phenomena occurs. These wear phenomena, which may, inter alia, be produced by the stroke of the piston rods and which may result in the hydraulic cylinder becoming not tightly sealed, can therefore easily be eliminated simply by interchanging the wearing bush.

BRIEF DESCRIPTION OF THE DRAWINGS

Certain embodiment of the present invention will be further described, by way of example, with reference to the accompanying drawings, in which.

DESCRIPTION OF PREFERRED EMBODIMENTS

Figure 1:
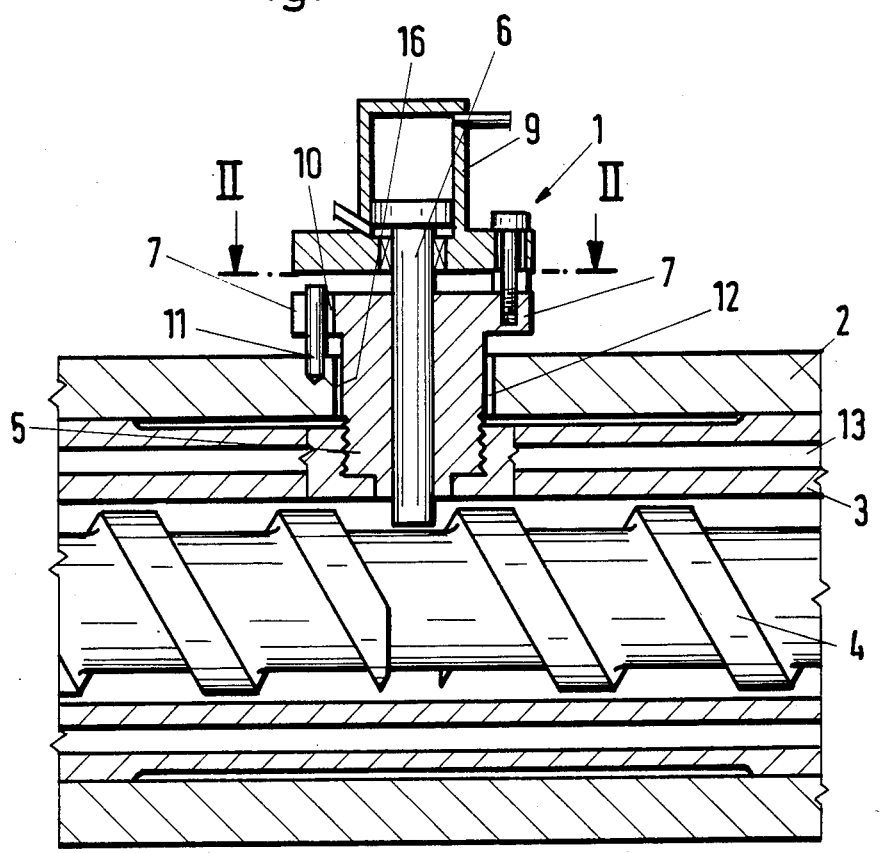
FIG. 1 is a longitudinal sectional view of a portion of a pin-barrel extruder in accordance with the present invention.
Figure 2:
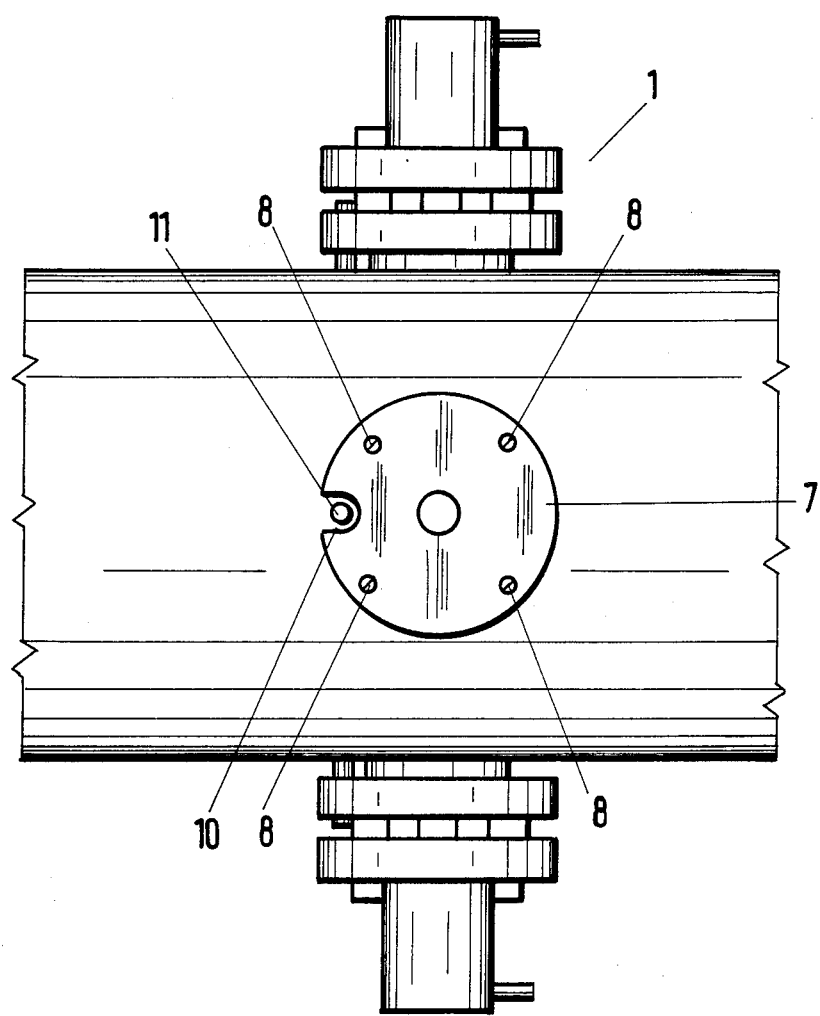
FIG. 2 is a plan view as would be seen when viewed along the line II—II in FIG. 1.

In FIG. 1, there is shown a portion of a pin-barrel extruder which comprises an outer hollow cylinder 2 and an inner hollow cylinder 3 which are co-axial with one another. An extrusion screw 4 rotates in the cylinder 3. A guide sleeve 5 is screwed into the curved surface of the inner hollow cylinder 3 so as to accommodate a pin body 6 which projects radially inwardly to adjacent the core of the screw 4. A plurality of such guide sleeves are provided around the periphery of the cylinder so as to provide one or more pin planes 1.

The guide sleeve 5 includes an annular flange portion 7 which is screw-connected to an hydraulic piston and cylinder arrangement 9 by means of screws 8 so that the pin bodies 6 can be adjusted to alter their depth of penetration into the inner cylinder 3. The flange portion 7 is located radially outwardly of the outer cylinder 2. A slot 10 is formed in the annular flange 7, and a rotation-preventing locking pin 11, which is screwed into the curved surface of the outer hollow cylinder 2, projects through the slot 10. This pin 11 prevents the guide sleeve 5 from becoming unscrewed from the inner cylinder 2 and working loose.

A free annular gap 12 is provided around the periphery of the guide sleeve 5, that is to say, between the sleeve 5 and a bore 16, formed in the outer hollow cylinder 2 to receive the sleeve 5.

During operation of such pin-barrel extrusion devices, the barrel portions may be either heated or cooled by assemblies (not shown) which are connected to axially extending peripheral bores 13 disposed between the inner cylinder or barrel 3 and the outer cylinder or barrel 2. However, the inner hollow cylinder 3 expands more, on heating, than the outer hollow cylinder 2, so that relative movement of the centres of gravity of the two cylinders occurs. This movement occurs in the longitudinal direction of the cylinders.

However, the provision of the annular gap 12 around the guide sleeve 5 means that the greater expansion of the inner hollow cylinder 3 compared with that of the cylinder 2 cannot cause the guide sleeve 5, and the pin body 6 located therein, to be stressed or deformed. The gap 12 allows longitudinal travel of the sleeve caused by the thermal expansions.

Figure 3:
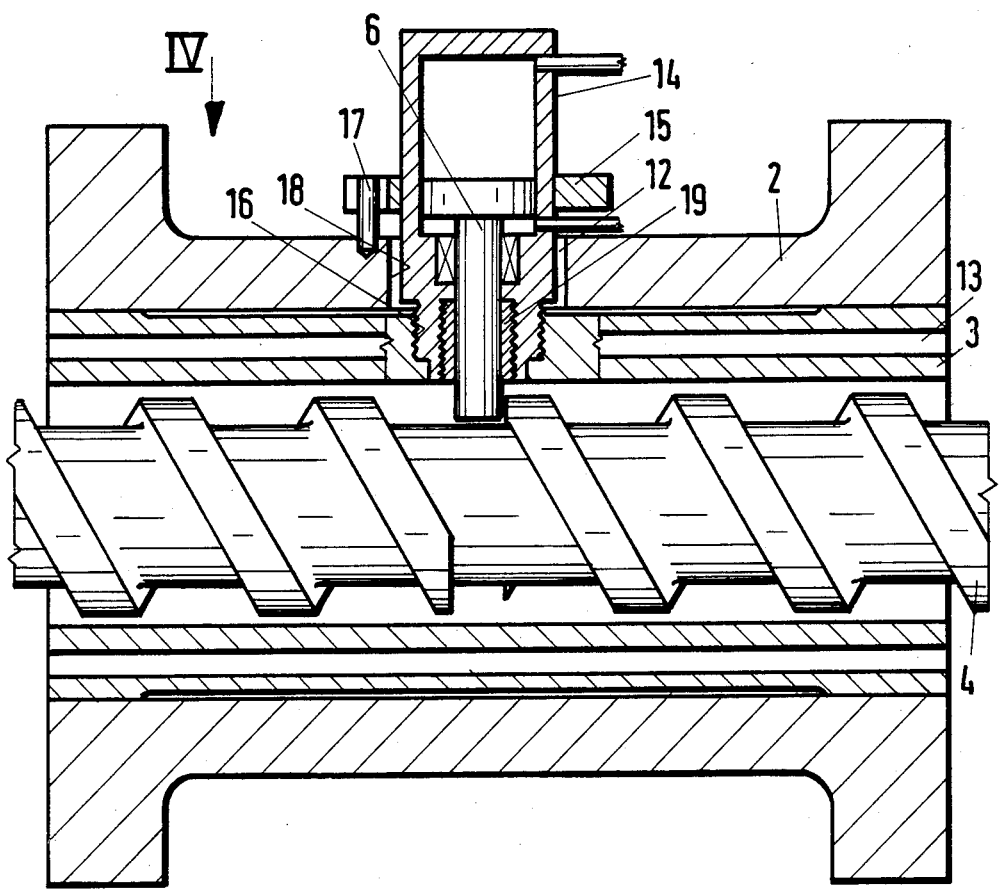
FIG. 3 is a longitudinal sectional view similar to FIG. 1 but of a modified embodiment of a pin barrel extruder in accordance with the present invention.
Figure 4:
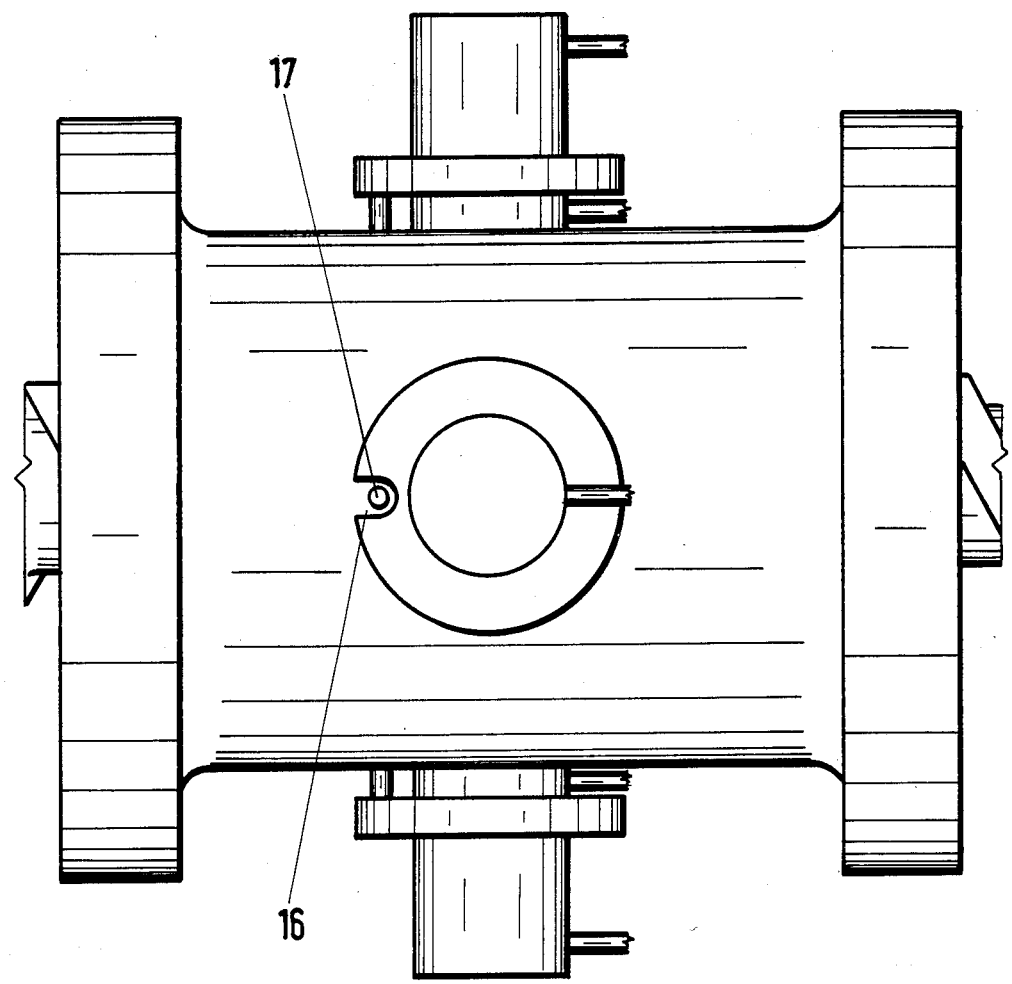
FIG. 4 is a plan view, similar to FIG. 2 but of the embodiment shown in FIG. 3.

In the embodiment shown in FIG. 3, the guide sleeve for the pin bodies 6 comprises a wall member of a hydraulic piston and cylinder arrangement 14, the end of the wall nearer the screw 4 being screw-connected to the inner hollow cylinder 3.

An annular flange 15 is provided on the hydraulic cylinder, substantially half-way along its length, and has a slot 16 formed therein in which a rotation-preventing locking pin 17 engages.

A free annular gap 12 is thus defined around the hydraulic cylinder 14 between the bore 18 and the outer jacket of the hydraulic cylinder 14. This gap 12 allows for the differential thermal expansion of the inner hollow cylinder 3 and of the outer hollow cylinder 2. The possibility of the relative movement between the two cylinders 2 and 3, which would otherwise cause the guide sleeve or the wall of the hydraulic cylinder 14 to become deformed, is thus eliminated. In this embodiment, the piston rod of the hydraulic cylinder 14 is simultaneously formed as the radially adjustable pin body 6.

A wearing and sealing sleeve 19 is disposed around the pin body 6 to prevent material entering the hydraulic cylinder. In the event of wear, it is possible for the sleeve 19 to be easily replaced once the rotation-preventing locking pin 17 has been removed and the hydraulic cylinder 14 has been unscrewed from the radial bore in the hollow inner cylinder.

I claim:

1. A pin-barrel extrusion device for processing thermoplastics comprising a barrel, said barrel comprising a hollow inner cylinder and a hollow outer cylinder coaxial with and surrounding said hollow inner cylinder, said outer cylinder being spaced apart from said inner cylinder, an extrusion screw mounted for rotation within said inner cylinder, said screw comprising a core and flight means helically disposed around said core, both said inner cylinder and said outer cylinder defining radially extending bores, each said bore in said inner cylinder being alinged with a said outer cylinder, guide sleeve means disposed in each said pair of aligned bores, said guide sleeve means comprising opposed first and second end regions, means detachably mounting said first end region to said inner cylinder, said second end region projecting radially outwardly of said outer cylinder, pin means disposed in each said pair of aligned bores, each said pin means including a first end region disposed adjacent said screw core, means for adjusting the spacing of said first end region of each said pin from said screw core and temperature control medium bores disposed around said barrel, wherein said radial bore formed in said outer hollow cylinder has a diameter greater than that of said guide sleeve thereby defining an annular gap between said guide sleeve and said radially extending bore in said outer cylinder.

2. A pin-barrel extrusion device as recited in claim 1, wherein said guide sleeve is screw-threadedly retained in position in said radial bore in said inner hollow cylinder to provide said detachable mounting.

3. A pin-barrel extrusion device as recited in claim 1, further comprising an annular flange member mounted on said second end region of said guide sleeve, said flange member defining a throughbore and locking pin means extending through said throughbore, said locking means including a screw-threaded portion, said outer cylinder further including screw-threaded bore means in its radially outer surface for receiving said screw-threaded portion of said locking pin means.

4. A pin-barrel extrusion device as recited in claim 1, wherein said hollow outer cylinder defines a radially extending bore, said device further including hydraulic piston and cylinder means disposed in said radial bore, said guide sleeve forming part of said cylinder of said piston and cylinder arrangement, said hydraulic cylinder having a diameter smaller than that of said radial bore to define an annular gap therebetween.

5. A pin-barrel extrusion device as recited in claim 4, wherein said pistons of said piston and cylinder arrangements each include a piston rod, said piston rods simultaneously forming said axially adjustable pin bodies.

6. A pin-barrel extrusion device as recited in claim 4, wherein said pistons of said piston and cylinder arrangements each include a piston rod, said piston rods simultaneously forming said axially adjustable pin bodies, said cylinder of said piston and cylinder arrangement further carrying a radially extending wearing bush for receiving said piston rod, said wearing bush terminating substantially flush with said inner surface of said hollow inner cylinder.

* * * * *